US010310628B2

(12) United States Patent
Kim

(10) Patent No.: US 10,310,628 B2
(45) Date of Patent: Jun. 4, 2019

(54) TYPE ERROR REVISING METHOD

(71) Applicant: NAVER CORPORATION, Seongnam-si (KR)

(72) Inventor: Min Chul Kim, Seoul (KR)

(73) Assignee: NAVER Corporation, Seongnam-si (KR)

(*) Notice: Subject to any disclaimer, the term of this patent is extended or adjusted under 35 U.S.C. 154(b) by 453 days.

(21) Appl. No.: 14/126,142

(22) PCT Filed: Nov. 21, 2013

(86) PCT No.: PCT/KR2013/010595
§ 371 (c)(1),
(2) Date: Dec. 13, 2013

(87) PCT Pub. No.: WO2014/171605
PCT Pub. Date: Oct. 23, 2014

(65) Prior Publication Data
US 2016/0132129 A1    May 12, 2016

(30) Foreign Application Priority Data
Apr. 15, 2013   (KR) .................. 10-2013-0041134

(51) Int. Cl.
G06F 17/27    (2006.01)
G06F 3/023    (2006.01)
G06F 3/033    (2013.01)

(52) U.S. Cl.
CPC .......... *G06F 3/0237* (2013.01); *G06F 3/0233* (2013.01); *G06F 3/033* (2013.01); *G06F 17/273* (2013.01); *G06F 17/2735* (2013.01)

(58) Field of Classification Search
CPC ... G06F 3/0237; G06F 17/273; G06F 17/2735
(Continued)

(56) References Cited

U.S. PATENT DOCUMENTS 6,047,300 A * 4/2000 Walfish ................. G06F 17/273
715/257
6,690,364 B1 * 2/2004 Webb .................. G06F 3/04883
345/173
(Continued)

FOREIGN PATENT DOCUMENTS

KR   10-2012-0102260   9/2012
KR   10-1294558        8/2013

OTHER PUBLICATIONS

U.S. Appl. No. 14/131,538, filed Jan. 8, 2013.
(Continued)

*Primary Examiner* — Frank D Mills
(74) *Attorney, Agent, or Firm* — Greer, Burns & Grain, Ltd

(57) ABSTRACT

The present invention is directed to a type error revising method. According to the present invention, a new and innovative error revising method is provided, which does not require inconvenient action of inputting deletion function key like backspace or moving a cursor by the mouse control or finger touch.
The type error revising method of the present invention comprises steps of; a user inputs revision target word or character substring in the current cursor location; the user's revision intention is determined automatically or according to user's input of revision command; and one or more words or character substrings input before the revision target word or character substring are replaced by the revision target word or character substring. In the present invention, the replaced one or more words or character substrings are selected through a correlation calculation with the revision target word or character substring or substring thereof.

3 Claims, 2 Drawing Sheets

(58) Field of Classification Search
USPC .......................................................... 715/261
See application file for complete search history.

(56) References Cited

U.S. PATENT DOCUMENTS

| | | | | |
|---|---|---|---|---|
| 6,801,190 B1* | 10/2004 | Robinson | .............. | G06F 3/0219 345/173 |
| 7,286,115 B2 | 10/2007 | Longe et al. | | |
| 8,201,087 B2 | 6/2012 | Kay et al. | | |
| 8,225,203 B2 | 7/2012 | Unruh | | |
| 8,493,344 B2 | 7/2013 | Fleizach et al. | | |
| 9,081,761 B1 | 7/2015 | Little et al. | | |
| 2009/0113293 A1* | 4/2009 | Schubert | ................. | G06F 17/24 715/256 |
| 2009/0193088 A1* | 7/2009 | Cervantes | ............ | G06Q 10/107 709/206 |
| 2011/0205182 A1* | 8/2011 | Miyazawa | .......... | G06F 3/04883 345/174 |
| 2012/0246133 A1* | 9/2012 | Hsu | ....................... | G06F 17/273 707/706 |
| 2014/0104175 A1* | 4/2014 | Ouyang | .............. | G06F 17/2735 345/168 |
| 2014/0317495 A1* | 10/2014 | Lau | ....................... | G06F 17/273 715/257 |
| 2016/0132471 A1 | 5/2016 | Kim | | |

OTHER PUBLICATIONS

KIPO Office Action dated Dec. 19, 2013 in corresponding Korean Patent Application No. 10-2013-0137964.
Kim, Min Chul, U.S. Appl. No. 14/131,538, filed Jan. 8, 2014.
Kim, Min Chul, Office Action issued in U.S. Appl. No. 14/131,538, dated Mar. 28, 2016.
Kim, Min Chul, Office Action issued in U.S. Appl. No. 14/131,538, dated Jun. 7, 2018.

* cited by examiner

[Fig. 1]
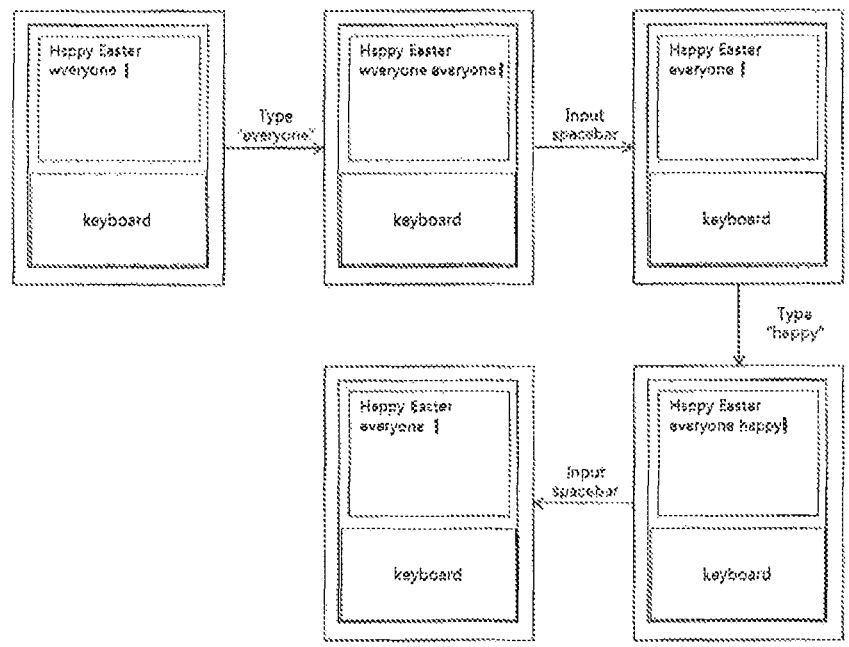
[Fig. 2]
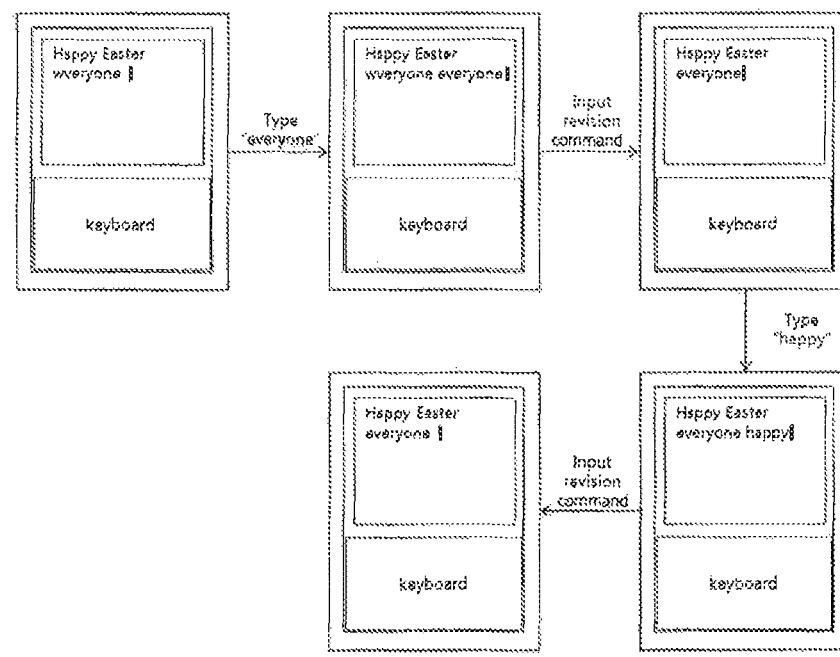

[Fig. 3]
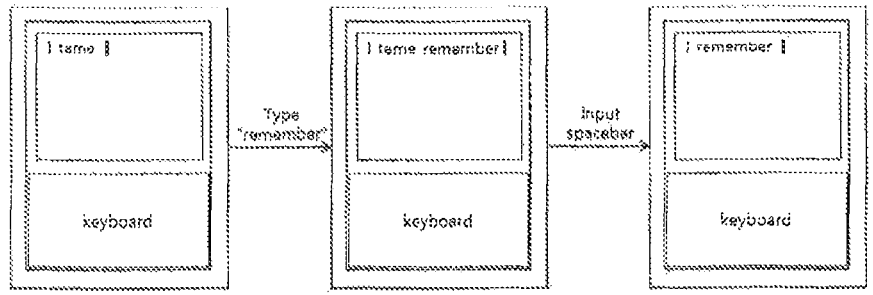
[Fig. 4]
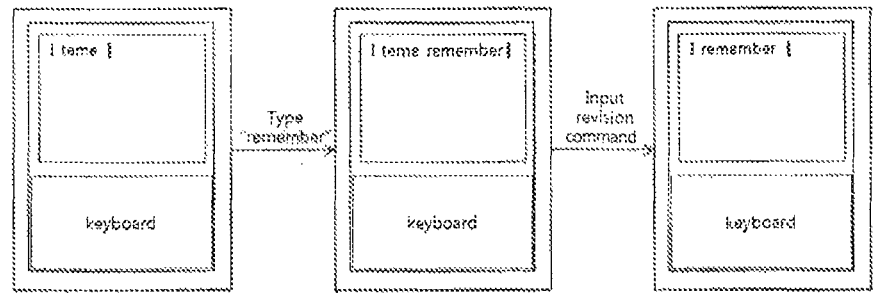
[Fig. 5]
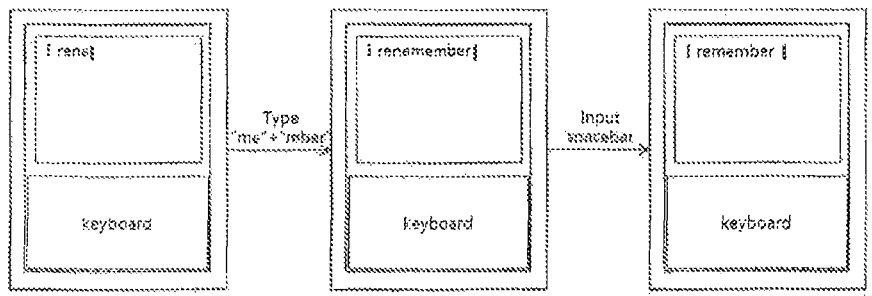
[Fig. 6]
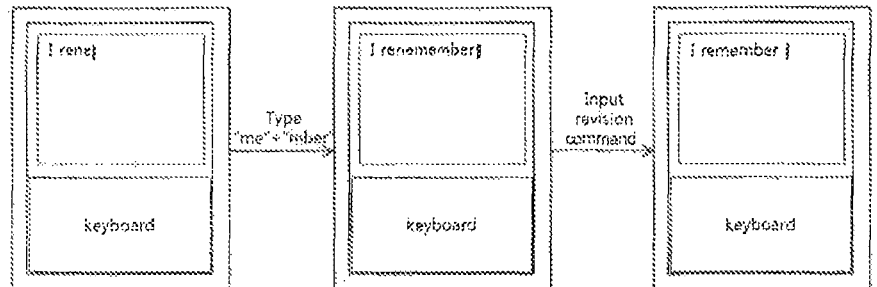

TYPE ERROR REVISING METHOD

TECHNICAL FIELD

The present invention is directed to a type error revising method and a device implementing the same method. The method of the present invention can be applied to a keyboard input of personal computers as well as to a touch keypad input of smart phones and keypad input of all mobile phones (including feature phones).

BACKGROUND ART

Typical type error revising method when inputting characters (all types of inputtable characters including English characters, Korean characters, numbers, special characters, etc.) in personal computers or in mobile phones is to delete all words between the word including type error and the current cursor location using deletion function key like backspace, and retype the whole deleted words, or to move a cursor to the word including type error using a mouse (in case of personal computers) or using a finger touch (in case of mobile devices) and retype the word including type error.

However, when there exist correctly typed words between the word including type error and the current cursor location, the correctly typed words as well as the word including type error should be deleted when applying the typical type error revising method of inputting deletion function key like backspace. When moving a cursor using a mouse in personal computers, one of the hands should be relocated from a keyboard to a mouse, the cursor should be accurately placed in a location of type error through the mouse control, and the cursor should be returned to the previous location for resuming character input through the mouse control. This user attention requiring process is quite inconvenient. When moving a cursor using a finger touch in mobile devices, the accuracy of cursor control is not generally good enough to locate the cursor in a location of type error at one time and also requires user attention, thus is quite inconvenient.

The auto-correction function was developed in order to enhance user convenience in revising type errors. This auto-correction function has been already commercialized, and works to automatically correct the word "A," which the user actually typed, to the word "B," when the machine decides that the word "A" is a type error and should be revised to the word "B." Automatically retyped word "B" should exist in a library of the machine, and is not required to be retyped by the user.

In the above auto-correction function, it is apparent that the retyped word "B" is not actually input by the user with the intention of revision, but is what the machine presumes that the user actually intended to input. Thus, there are problems when the accuracy of presumption is not good enough. The problematic accuracy of presumption is partly because of the limited number of words registered in a library of the machine. These days, many users frequently use newly coined words or new abbreviations, which are not covered by the old library, in typing environment of personal computers and mobile devices. Thus, if the library is not frequently updated, the limitation of the library becomes more and more remarkable. For this reason, many users turn the auto-correction function off when they input characters, even though their devices (personal computers or mobile devices) are equipped with the auto-correction function.

A further problem of the auto-correction function is that the auto-correction works only in a currently inputting word. Thus, when the users find that there are type errors in the already input words, not in the currently inputting words, like in the typical error revising methods described above, the words between the word including type errors and the current cursor location should be deleted through inputting the deletion function key like backspace, or a cursor should be moved by a mouse control or finger touch to the location of type errors.

DISCLOSURE OF INVENTION

Technical Problem

The objective of the present invention is to solve the problems of the above-described prior art technologies. More specifically, the objective of the present invention is to provide an error revising method and a device implementing this method, which does not require inconvenient action of inputting deletion function key like backspace or moving a cursor by the mouse control or finger touch.

Solution to Problem

The unique technical means, which achieve the objectives of the present invention, will be described in the following.

The technical means of the present invention can be classified into three (3) groups, and each group can be classified into a method in which user's intention for revision is automatically detected and a method in which user directly provides a revision command.

It is common in all means of the present invention that the type errors are not deleted using the deletion function key like backspace, and that the cursor is not controlled by the user to be located to an accurate position of the type errors. The user does not move the cursor location for the type error revision, but inputs correct words or characters without cursor location change. The user's activity for revising type errors takes place in the current cursor location.

In the specification of the present invention, the term "word" is defined as series of characters. It is not required that the word, i.e., series of characters is listed in the library. Each word is separated from another word by a space.

(First means: Comparison between the one or more already input word and the newly input word in a predetermined range)

This means is applied when there are type errors in one or more already input words. One or more words including type errors are replaced with newly input word.

First, the method, in which user's intention for revision is automatically detected, is described.

Every time when the user inputs word, the input word is compared with a library. The word which is not listed in the library is registered as a candidate word to be revised. A correlation between the newly input word and the candidate word to be revised is calculated. If the correlation is larger than predetermined value, then it is decided that the newly input word is made out of the user's intention for revision. When a space is input after the newly input word, then the candidate word to be revised is replaced by the newly input word.

Next, the method, in which user directly provides a revision command, is described.

If the user inputs word and thereafter a revision command is made, the input word is recognized as a revision target word. Then, a correlation between the revision target word and the words, which have been input before the input of the revision target word, is calculated. If there exist one or more words, of which the calculated correlation is above predetermined value, such words are replaced by the revision target word.

(Second means: Comparison between the newly input word and the word input right before the newly input word)

This means is applied when the user recognizes type error before completing input of the intended word. In this case, the user inputs a space in a state that input of the intended word is not completed, inputs a new correct word, and then replaces the word including type error input right before the new correct word with the new correct word.

First, the method in which user's intention for revision is automatically detected is described.

Every time when the user inputs word, the input word is compared with a library. The word which is not listed in the library is registered as a candidate word to be revised. A correlation between a substring starting from the first character of the newly input word and the candidate word, which is input right before the newly input word, is calculated. If the correlation is larger than predetermined value, then it is decided that the newly input word is made out of the user's intention for revision. When a space is input after the newly input word, then the candidate word to be revised is replaced by the newly input word.

Next, the method in which the user directly provides a revision command is described.

If the user inputs word and thereafter a revision command is made, the input word is recognized as a revision target word. Then, a correlation between a substring starting from the first character of the revision target word and the word, which is input right before the revision target word, is calculated. If the correlation is larger than predetermined value, then the word, which is input right before the revision target word, is replaced by the revision target word.

(Third means: Comparison between substrings within a word)

This means is applied when the user recognizes type error before completing input of the intended word. Differently from the second means, the user does not input a space and continuously input correct characters and then the character substring including type error is replaced by the correct character substring to complete input of a word.

First, the method, in which user's intention for revision is automatically detected, is described.

If the user completes input of a word, the input word is compared with a library. In case the input word is not listed in the library, it is determined whether there exist character substrings within the input word, which are highly correlated with each other. If it is determined that there exist character substrings within the input word, which are highly correlated with each other, then it is determined whether a word, in which the previously input character substring is replaced by the later input character substring, exists in the library. If it is determined that such word exists in the library, the previously input character substring is replaced by the later input character substring to complete input of a word.

Next, the method, in which user directly provides a revision command, is described.

If the user inputs word and thereafter a revision command is made, a correlation between character substrings within the input word is calculated. If it is determined that there exist character substrings within the input word, which are highly correlated with each other, then it is determined whether a word, in which the previously input character substring is replaced by the later input character substring, exists in the library. If it is determined that such word exists in the library, the previously input character substring is replaced by the later input character substring to complete input of a word.

Advantageous Effects of Invention

According to the present invention, it becomes possible to correct type errors without inputting deletion function keys such as a backspace, thus a fast and convenient error correction becomes possible in comparison with the conventional method of type error correction.

BRIEF DESCRIPTION OF DRAWINGS

FIG. 1 depicts an embodiment in which user's intention for revision is automatically detected according to the first means.

FIG. 2 depicts an embodiment in which user directly provides a revision command according to the first means.

FIG. 3 depicts an embodiment in which user's intention for revision is automatically detected according to the second means.

FIG. 4 depicts an embodiment in which user directly provides a revision command according to the second means.

FIG. 5 depicts an embodiment in which user's intention for revision is automatically detected according to the third means.

FIG. 6 depicts an embodiment in which user directly provides a revision command according to the third means.

MODE OF THE INVENTION

FIG. 1 depicts an embodiment in which user's intention for revision is automatically detected according to the first means. The user intended input of "Happy Easter everyone," but actually input "Hsppy Easter wveryone." According to the first means, every time when the user inputs word, the input word is compared with a library, and the word which is not listed in the library is registered as a candidate word to be revised. Thus, in the above case, the words "Hsppy" and "wveryone" are registered as candidate words to be revised. At the state that the user has input "Hsppy Easter wveryone," the user recognizes type error made at "wveryone," and wishes to revise it to "everyone." For this, the user inputs a space after "Hsppy Easter wveryone," and then inputs "everyone." At this state, the user's input is now "Hsppy Easter wveryone everyone." According to the first means, a correlation between the newly input word and the candidate word to be revised is calculated. In this example, since the newly input word, "everyone," is highly correlated with "wveryone," which is one of the candidate words to be revised, the newly input word, "everyone," is determined to have been made out of the user's intention for revision. According to such determination, when the users inputs a space, "wveryone" is replaced by "everyone" so that the whole sentence "Hsppy Easter wveryone everyone" is changed to "Hsppy Easter everyone." At this state, the user additionally recognizes type error made at "Hsppy," and wishes to revise it. For this, the user inputs a correct word of "happy." Since one of the two candidate words to be revised, "wveryone," has been already revised to "everyone," there currently exists only one candidate word to be revised, which is "Hsppy." Since "Hsppy" is highly correlated with "happy," the newly input word, "happy," is determined to have been made out of the user's intention for revision. According to such determination, "Hsppy," which is a candidate word to be revised, is replaced by "happy," and in the course of such replacement, it is further detected that the word "happy" should be the first word of a sentence, accordingly a character "h" of "happy" is changed to an upper case "H." Now, the whole sentence "Hsppy Easter everyone" is changed to "Happy Easter everyone" to complete revision. The range of determination of the candidate words to be revised can be freely set according to the circumstances. For example, the range may be set to ten (10) words before the currently inputting word or to hundred (100) words before the currently inputting word. The range can also be set to the entire document which the user is working on. The method of determination of the correlation between words, which is used during the above revision procedure, is described below.

A determination of the correlation between words can be practiced in various ways. Representatively, the following two ways are used. The first one is based on that although a user intends to input a certain key, the possibility of actual input of a key abutting the intended key in a keyboard layout is high. For example, in a correlation determination between "everyone" and "wveryone," there exists a difference between the two words only in the first characters "e," and "w." Also, the character "e" and "w" abut each other in a keyboard layout, thus it is highly likely that the user intended to input "e," but the actual input of "w" was made. Accordingly, the system determines that "everyone" and "wveryone" are highly correlated with each other. The second one is based on the changed input sequence of characters. When a user inputs characters in a high speed, an input sequence of characters are frequently changed. For example, in a correlation determination between "everyone" and "evreyone," there exists a difference between the two words in the third and fourth characters, i.e., "er" in "everyone" and "re" in "evreyone." Between "er" and "re," a difference lies in the input sequence. In such a case, the system determines that "everyone" and "evreyone," are highly correlated with each other. When a user inputs a long word, the number of mis-inputs of abutting keys and the number of mis-inputs of changed input sequence may increase, thus in a quantification processing of the correlation, a different standard may be applied according to the length of a word. The correlation determination methods, which can be applied in the present invention, are not limited to the above-described two methods.

FIG. 2 depicts an embodiment in which the user directly provides a revision command according to the first means. The user intended input of "Happy Easter everyone," but actually input "Hsppy Easter wveryone." The user first recognizes type error at "wveryone," and for a revision thereof, inputs a space after "Hsppy Easter wveryone," and then types "everyone." At this state, the user makes a revision command. The revision command may be practiced in various ways. Using a function key or a certain area in a virtual keyboard for the revision command is possible. When the revision command is practiced in a mobile device, a slight shaking action of the mobile device, or left, right, upword or downword swiping gestures in virtual keyboard may be recognized as the revision command. In any way, if the revision command is made after the input of "everyone," the system recognizes "everyone" as a revision target word. Then, a correlation between the revision target word and the words, which have been input before input of the revision target word, is calculated. Among the words, which have been input before the input of "everyone," which is the revision target word, "wveryone" is highly related with the revision target word, "everyone." Thus, "wveryone," is replaced by the revision target word, "everyone," according to the revision command. At this state, "Hsppy Easter wveryone everyone," which the user has input until now is changed to "Hsppy Easter everyone." The user now additionally recognizes a type error at "Hsppy," and inputs a space after "everyone," and continuously inputs "happy." Thereafter, the user makes the revision command again. Then, "happy" is recognized as the revision target word, and a correlation between the revision target word and the words, which have been input before input of the revision target word, is calculated. According to such correlation calculation, "Hsppy" is found to be highly related to "happy." Thus, "Hsppy" is replaced by "happy," and in the course of such replacement, it is further detected that the word "happy" should be the first word of a sentence, accordingly a character "h" of "happy" is changed to an upper case "H." Now, the whole sentence "Hsppy Easter everyone" is changed to "Happy Easter everyone" to complete revision. The range of determination of the candidate words to be revised can be freely set according to the circumstances. For example, the range may be set to ten (10) words before the currently inputting word or to hundred (100) words before the currently inputting word. The range can also be set to the entire document which the user is working on. For the correlation calculation methods, the same methods as described in the above embodiment of FIG. 1 can be used.

FIG. 3 depicts an embodiment in which user's intention for revision is automatically detected according to the second means. While the user is typing with the intention of typing "I remember," the user recognizes that the actual typing has been made as "I teme" by mistake instead of "I reme". At this state, the user inputs a space, then "teme" is recognized by the system as a word. According to the second means, every time when the user inputs word, the input word is compared with a library, and the word which is not listed in the library is registered as a candidate word to be revised. Since "teme" is not in the library, it is registered in the system as a candidate word to be revised. Thereafter, the user inputs originally intended word, "remember," thus the user's entire input is now "I teme remember." A correlation between a substring starting from the first character of the newly input word, i.e., "r" and the candidate word, which is input right before the newly input word, is calculated. Since the candidate word, which is input right before the newly input word, "teme," comprises four (4) characters, the first four (4) characters of "remember," i.e., "reme" may be compared with "teme." But the length of substring staring from the first character of the newly input word is not limited to the number of characters of the candidate word. Since the candidate word, "teme," which is input right before the newly input word, and "reme," which is substring staring from the first character of the newly input word, are highly correlated with each other, the system recognizes that the newly input word "remember" is out of the user's intention for revision. Then, "teme," which is a candidate word to be revised, is replaced by "remember" to complete revision. For the correlation calculation methods, the same methods as described in the above embodiment of FIG. 1 can be used.

FIG. 4 depicts an embodiment in which the user directly provides a revision command according to the second means. While the user is typing with the intention of typing "I remember," the user recognizes that the actual typing has been made as "I teme" by mistake instead of "I reme." At this state, the user inputs a space, and then continuously inputs "remember." The revision command is made thereafter. According to the revision command, which can be practiced variously as described above, "remember" is recognized by the system as a revision target word. A correlation between a substring starting from the first character of the revision target word and the word, which is input right before the revision target word, is calculated. Since the word, which is input right before the revision target word, "teme," comprises four (4) characters, the first four (4) characters of "remember," i.e., "reme" may be compared with "teme." But the length of substring staring from the first character of the revision target word is not limited to the number of characters of the word, which is input right before the revision target word. Since "reme" and "teme" are highly related with each other, "teme," which is input right before the revision target word, is replaced by "remember," which is revision target word to complete revision. For the correlation calculation methods, the same methods as described in the above embodiment of FIG. 1 can be used.

FIG. 5 depicts an embodiment in which user's intention for revision is automatically detected according to the third means. The user intended to input "I remember," but at the state that the actual input is made as "I rene," the user recognizes that the actual input of "rene" was erroneously made instead of correct input of "reme." In the embodiments of FIGS. 3 and 4, the user inputs a space to make "rene" recognized as a word, and then types correct word of "remember" to replace "rene" with "remember." However, unlike in the embodiments of FIGS. 3 and 4, the user does not input a space after "rene," and continues to input correct characters in order to to revise type error. Considering the originally intended word, "remember" and actually input characters "rene," the first and second characters do not involve errors, and the error is made at the third character, thus the user inputs from the third character of the intended word, "remember," i.e., to the last character of the intended word. Accordingly, the user's input is now "I renemember." At the state that the input of "renemember" is complete as a word, it is determined whether such a word is in the library. In case the word is not listed in the library, it is determined whether there exist character substrings within the word, which are highly correlated with each other. In the present embodiment, character substrings "ne" and "me" in the word of "renemember" are determined to be highly correlated with each other, and then, it is determined whether a word, in which the previously input character substring, "ne," is replaced by the later input character substring, "me," exists in the library. Since the result of such replacement is "remember," and this word is in the library, the previously input character substring, "ne," is replaced by the later input character substring, "me," to change the input of "renemember" to "remember."

While the user inputs "renemember," the method of determination of the correlation between character substrings is described below. Here, among various methods for correlation determination, focus is made on the high possibility of erroneous input of a key transversely abutting the intended key in a keyboard layout. That is, when "s" is input, the possibility that this input has been erroneously made instead of intended input of "a," which abuts "s" in the left, or instead of intended input of "d," which abuts "s" in the right, is considered. When the first character "r" is input, there does not exist another character to be compared with it. When "re" is input, the first character "r" and the second character "e" abut each other in a keyboard layout, thus the possibility that "e" has been input in a revision intention is considered, accordingly a revision candidate "A" is registered. When "ren" is input, the third character "n" does not abut first character "r" and second character "e," thus additionally candidate is not registered. When "rene" is input, the fourth character "e" abuts the first character "r," thus the possibility that the fourth character "e" has been input in an intention to revise "ren" is considered, a revision candidate "B" is registered. When "renem" is input, the fifth character "m" and the third input "n" abut each other, thus the possibility that the input of the fifth character "m" has been made out of an intention for revising "ne" is considered, accordingly a revision candidate "C" is registered. Also, the possibility that the input of fifth character "m" has been made out of an intention for revising "en" to "em" is considered, accordingly, a revision candidate "D" is registered. At this point, for the revision candidate "B," the input of fourth character "e" should be followed by "e" in order to decide that the fourth input "e" has been made out of an intention for revising "ren," but the fourth character "e" is actually followed by "m," thus the revision candidate "B" is dropped from the revision candidates. When "reneme" is input, the first character "r" and the sixth character "e" abuts each other, thus the possibility that the input of the sixth character "e" has been made out of an intention for revising "renem" is considered, accordingly a revision candidate "E" is registered. At this point, for the revision candidate "C," the possibility that the user intention revising "ne" to "me" becomes higher, thus the revision candidate remains as a revision candidate. Further, for the revision candidate "A," the character substring of "eneme" should be in the library in order to decide that the second input "e" has been made out of an intention for revising the first input "r," but the character substring "eneme" is not in the library, thus the revision candidate "A" is dropped from the revision candidates. When "renemem" is input, the seventh character "m" and the third character "n" abut each other, thus the possibility that the input of the seventh character "m" has been made out of an intention for revising "neme" is considered, accordingly, a revision candidate "F" is registered. Further, the possibility that the input of the seventh character "m" has been made out of an intention for revising "en," which are second and third characters, to "em," which are sixth and seventh characters, is considered, accordingly, a revision candidate "G" is registered. At this point, for the revision candidate "E," which considers possiblity of revision of "renem" the system determines that the input of sixth and seventh characters, "em," is not made out of an intention for revising "renem," accordingly, the revision candidate "E" is dropped from the revision candidates. When "renememb" is input, the eighth character "b" and the third character "n" abut each other, thus, the possibility that the input of the eighth character "b" has been made out of an intention for revising "nemem" is considered, accordingly, a revision candidate "H" is registered. At this point, for the revision candidate "F," which considers possibility of revision of "neme", the system determines that the input of seventh and eighth characters, "mb," is not made out of an intention for revising "neme," accordingly the revision candidate "F" is dropped from the revision candidates. Further, for the revision candidate "G," which considers possibility of revising "en," which are second and third characters, to "em," which are sixth and seventh characters, the fourth character "e" and the eighth character "b" should be at least in a mutually abutting relationship, but this condition is not satisfied, accordingly, the revision candidate "G" is dropped from the revision candidates. When "renemembe" is input, the ninth character "e" and the first "a" abut each other, thus, the possibility that the input of the ninth character "e" has been made out of an intention for revising "renememb" is considered, accordingly, a revision candidate "I" is registered.

When "renemember" is input, the tenth character "r" abuts the second, fourth, sixth and ninth character "e," accordingly revision candidates "J," "K," "L," "M" are registered. At this point, for the revision candidate "H," which considers possibility of revision of "nemem," the system determines that the input of "ber" is not made out of an intention for revising "nemem," accordingly the revision candidate "H" is dropped from the revision candidates. Finally, when a space is input, for the revision candidate "I," which considers possibility of revision of "renememb," it is clear that "renememb" cannot be revised to "er," accordingly the revision candidate "I" is dropped from the revision candidates. For the same reason, the revision candidates, "J," "K," "L," "M" are also dropped from the revision candidates. Now, the remaining revision candidates are "C," which considers possibility of revision of third and fourth characters "ne" to fifth and sixth characters "me" and "D," which considers possibility of revision of second and third characters "en" to fourth and fifth characters "em." Since the revision result according to revision candidate "C" is "remember," which is identical to the revision result according to revision candidate "D," and the revised word, "remember," is in the library, the revision is finally completed. It should be noted that the above-described method of determination of the correlation between character substrings is exemplary, thus any modification can be practiced in the implementation of the present invention.

FIG. 6 depicts an embodiment in which user directly provides a revision command according to the third means. The user intended to input "I remember," but at the state that the actual input is made as "I rene," the user recognizes that the first and second characters were correctly input, but a type error occurred from the third character. Accordingly, the user resumes inputting from the third character without inputting a space after "I rene." Now, the user's input is "I renemember." The revision command is made thereafter. According to the revision command, which can be practiced variously as described above, a correlation between character substrings within the input word is calculated. In the present embodiment, character substrings "ne" and "me" in the word of "renemember" are determined to be highly correlated with each other, and then, it is determined whether a word, in which the previously input character substring, "ne," is replaced by the later input character substring, "me," exists in the library. Since the result of such replacement is "remember," and this word is in the library, the previously input character substring, "ne," is replaced by the later input character substring, "me," to change the input of "renemember" to "remember." For the method of correlation calculation among character substrings, the same method as described in the above embodiment of FIG. 5 can be used.

First to third means according to the present invention have been described in the above. Each means can be practiced independently and it is also possible for each mean to be implemented in combination with other means.

The invention claimed is:

1. A correction method, using a computer device, of correcting a word on a screen of the device, the method comprising the following steps:
   a first inputting step of inputting, via a user, one or more words to the device;
   a second inputting step of inputting, via the user, a revision target word, wherein the revision target word comprises only the word that the user intends as a replacement word, and further wherein the revision target word is input after a space following the one or more words input during the first inputting step;
   determining the user's revision intention automatically, via the device; and
   a replacing step of replacing the one or more words input before the revision target word, during the first inputting step, with the revision target word input during the second inputting step;
   wherein the replaced one or more words are selected through a correlation calculation with the revision target word;
   wherein, during the second inputting step, the user inputs a space after inputting the revision target word, and further wherein said space triggers the replacing step; and
   wherein the user's revision intention is automatically determined in the user's revision intention determination step, and the automatic user intention determination step comprises the following steps;
   performing a comparison with a library every time the user inputs a word during the first inputting step;
   wherein a word which is not listed in the library is registered as a revision candidate; and
   calculating a correlation between the revision target word input during the second inputting step and the revision candidate;
   when the calculated correlation is larger than a predetermined value, the user's input of revision target word is determined to be the user's revision intention.

2. The correction method according to claim 1, wherein the revision target word is separated from the word being replaced during the replacement step only by the space input during the second inputting step.

3. The correction method according to claim 1, wherein the revision target word is separated from the word being replaced during the replacement step by the space input during the second inputting step, as well as by at least one additional word input during the first inputting step.

* * * * *